April 10, 1934.  P. B. WATSON  1,954,465

DUSTLESS DISCHARGE HOUSING

Filed Feb. 12, 1931  2 Sheets-Sheet 1

INVENTOR
Philip Bickford Watson
BY his ATTORNEY
Arthur Wright

April 10, 1934.  P. B. WATSON  1,954,465
DUSTLESS DISCHARGE HOUSING
Filed Feb. 12, 1931   2 Sheets-Sheet 2
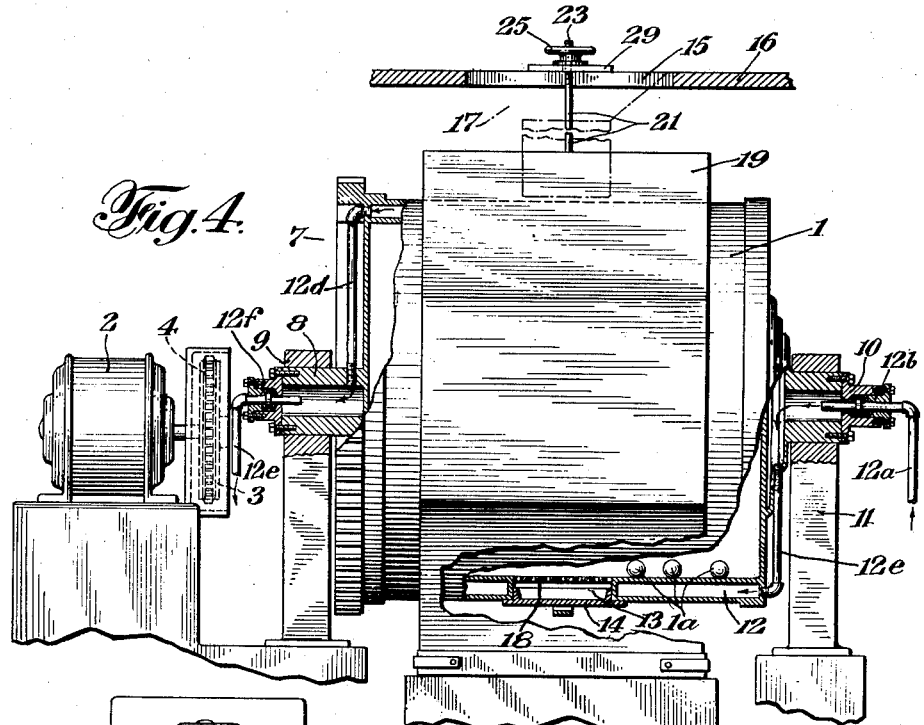
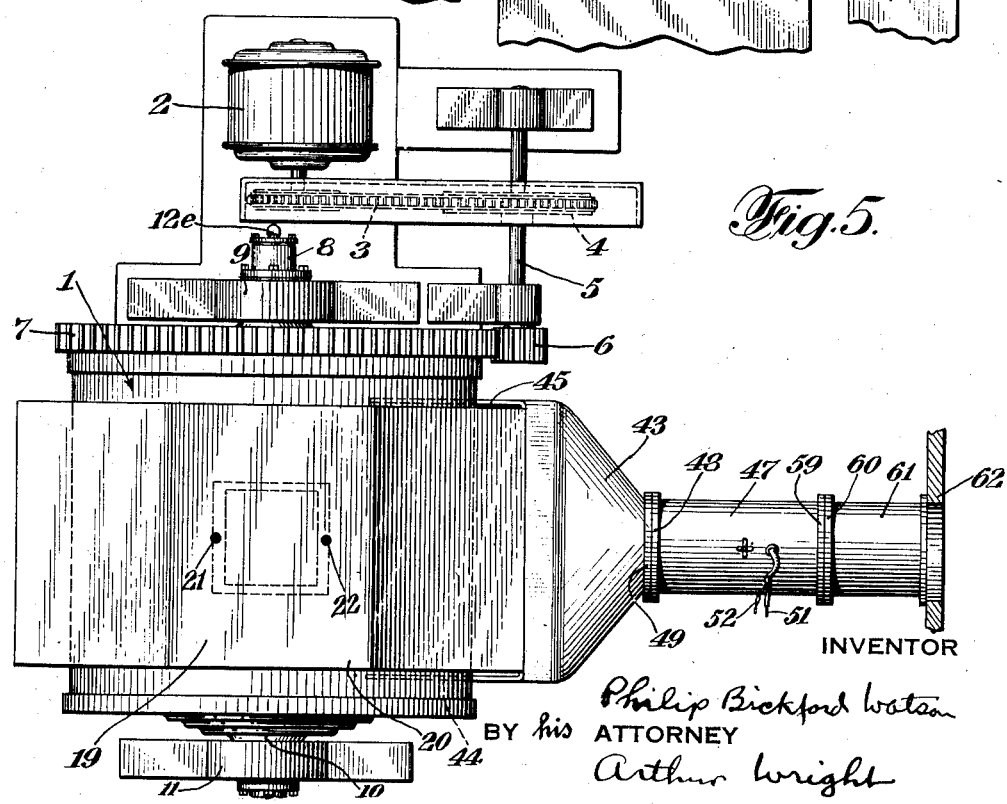
INVENTOR
Philip Bickford Watson
BY his ATTORNEY
Arthur Wright Patented Apr. 10, 1934

1,954,465

UNITED STATES PATENT OFFICE 1,954,465

DUSTLESS DISCHARGE HOUSING

Philip Bickford Watson, New York, N. Y., assignor to Synthetic Plastics Company, Inc., a corporation of Delaware Application February 12, 1931, Serial No. 515,318

8 Claims. (Cl. 83—9)

My invention relates particularly to an apparatus designed for preventing the escape of dust in manufacturing operations.

The object of my invention is to provide a discharge housing for preventing the escape of dusts in manufacturing operations, etc., and is applicable to the prevention of the escape of dust in many different types of operations, but is particularly applicable in the manufacture of molding powders containing artificial resins, as for example, urea resins. The object of my invention is especially adapted for the prevention of the escape of dust where powdered materials are handled, and especially where a number of different powdered materials, as for example, containing different colors, are handled in the same plant, as for example, in the case of the manufacture of urea resin molding powders made with a number of different colors. It has been found in the manufacture of such powders with different colors that the escape of even a small amount of dust into the atmosphere of the plant carrying a given color will seriously contaminate or affect the color of other lots of materials containing other colors in the same plant. For instance, a molding powder of this kind may be such as that disclosed in the patent to Pollak, No. 1,458,543, granted June 12, 1923, in which the urea condensation product in the form of a syrup is mixed or kneaded with a finely divided fibrous material, as for example, wood pulp. This material may be mixed with any desired kind of coloring material, such as any desired water soluble dye or any desired pigmented material, as for instance para toluidine toner to give a red color, ultramarine to give a dark blue color, and nigrosine or carbon black to give a black color, etc. This admixture is preferably made in a rotary ball-mill for grinding the substance into a fine powder, after which the ground powder, in the form of a very finely divided dust, is discharged from the mill for subsequent operations, as for instance, sifting, and then pressing at a pressure of 2000 lbs. per square inch at a temperature of 135° C. in a suitable mold for producing the hard, insoluble, infusible final product. In the discharge of the powdery materials from thee ball-mill it is desirable to take extraordinary precautions to prevent the escape of even small portions of the colored powder into the atmosphere of the plant where similar products with other colors are being handled and manufactured. The apparatus made in accordance with my invention accomplishes the objects above referred to and effectively avoids the contamination of said other products.

While my invention is capable of being carried out in many different ways, for the purpose of illustration I have shown only one embodiment of my invention in the accompanying drawings, in which—

Fig. 4 is an end elevation thereof; and

Fig. 5 is a plan view of the same.

Figure 1:
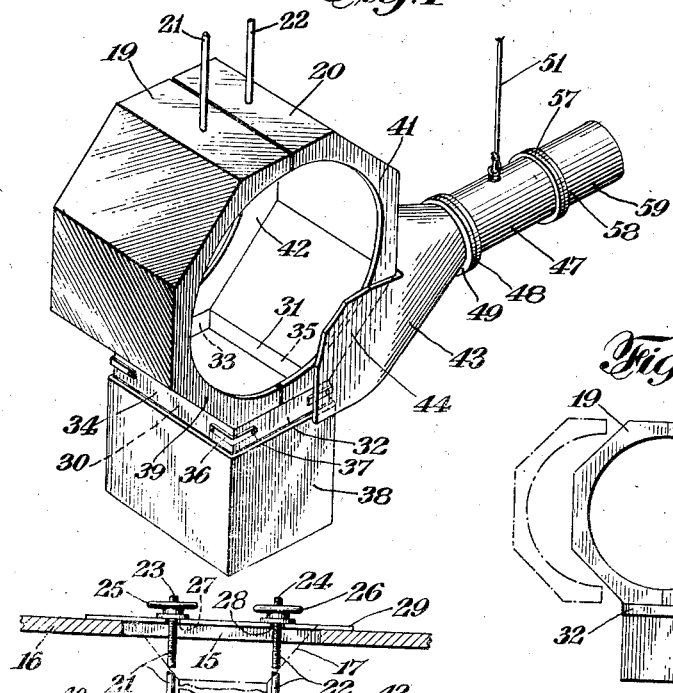
Fig. 1 is a perspective view of the housing apparatus made in accordance with my invention.
Figure 3:
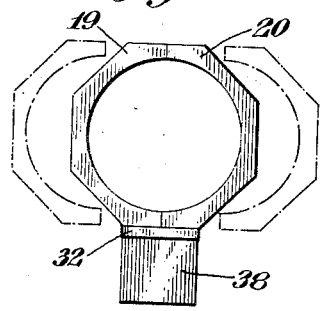
Fig. 3 is a diagrammatic view of the same showing the manner of removing the ball-mill housing.
Figure 2:
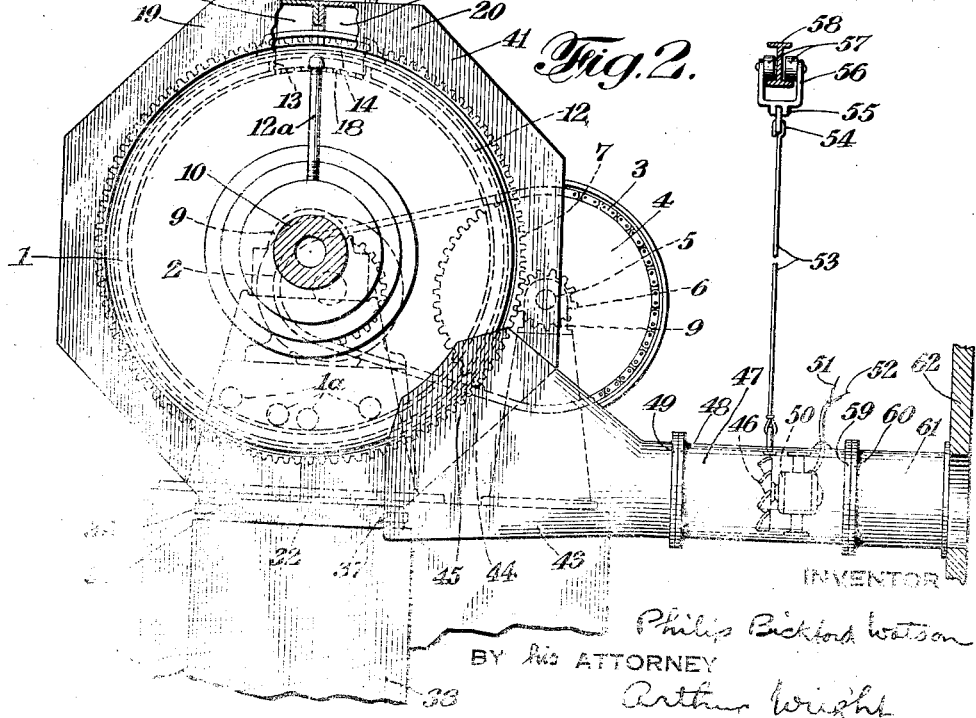
Fig. 2 is a side elevation of the ball-mill enclosure containing therein the ball-mill.

In the drawings, I have shown a ball-mill 1 adapted to be provided therein with any desired number of spherical grinding units or balls 1a of any desired size, as for instance 1 to 3 inches diameter. This ball-mill is driven from an electrical motor 2 having a chain 3 which drives a sprocket 4 on a shaft 5 for rotating a gear 6 which meshes with a large gear 7 on a ball-mill stud shaft 8 carried in bearings 9. The ball-mill at the other end has a stud shaft 10 carried in bearings 11. The ball-mill 1, which is preferably cylindrical in shape, has a cooling jacket 12 which is supplied with brine at a temperature of 26° F., and which is supplied to the ball-mill jacket in any desired manner, as follows: A brine supply pipe 12a passes through a stuffing box 12b in the shaft 10 and communicates by a pipe 12c with the cooling jacket 12, at one part of the mill periphery. The opposite part of the periphery thereof has a return pipe 12d, which connects with a brine discharge pipe 12e passing out through a stuffing box 12f in the shaft 8. The ball-mill 1, furthermore, has a manhole 13 normally covered by a manhole cover 14 adapted to be fastened in place in any desired manner. This manhole 13, in the supplying of the mill with the quantity of urea resin composition containing powdered wood fibre or paper pulp, is arranged to register with an opening 15 in a floor 16 located above the mill, a funnel 17 being inserted in the opening 15 during the filling operation. It will be noted that the filling opening 13 has across the same a grating 18 which permits the entry of the materials to be ground, but to prevent the escape of the balls 2 from the manhole 13 of the mill. After the mill has been supplied with the material to be ground the manhole cover 14 is restored to the opening 13 and the mill is then in order for operation for the grinding of the substances therein. After the grinding has been completed, that is to say, after grinding for a period of about eight hours, the contents of the mill are ready to be discharged. It is at this time that it is of great importance to prevent the escape into the atmosphere of even small amounts of the dust from the ground materials.

For this purpose I have provided a housing comprised of two laterally movable semi-circular housings 19 and 20 which are supported, respectively, when in place by means of links 21 and 22 having screw-threaded ends 23 and 24, respectively, carrying screw-threaded hand-wheels 25 and 26. The rods 21 and 22 are adapted to be inserted, respectively, in slots 27 and 28 in a cross-beam 29 which extends across the opening 15 and the floor 16 when the ball-mill is being discharged. The two halves of the housings 19 and 20 are provided, respectively, at their lower portions with flanges 30 and 31 which, when the housing is in use, are clamped together by cross-plates 32 and 33 which are adapted to be fastened to side plates 34 and 35 having an angle plate 36 at each of the corners of the housing adapted to be secured to the plates 32, 33, 34 and 35 by bolts or screws 37 of any desired character. Furthermore, these plates 32, 33, 34 and 35 form a rectangular enclosure, the dimensions of which are similar to the dimensions of a removable box 38 adapted to receive the powdered materials discharged from the ball-mill 1. It will furthermore be noted that the enclosure, comprising the semi-circular housings 19 and 20, is supported above the middle of the box 38 and so as to provide a clearance of approximately 3 inches between flanges 39, 40, 41 and 42 thereon and the ball-mill 1 so that in rotating the ball-mill 1 to discharge the contents therefrom the ball-mill will not be interfered with by the housing enclosing the same. In addition, the dust-control apparatus includes a funnel-shaped portion 43 which fits against the side of the semi-circular housing 20 in such a manner that lateral wings 44 and 45 extend around the flanges 41 and 42 and over a portion of the 3-inch annular clearance referred to so that there is always a current of air being withdrawn from the space between the semi-circular housings 19 and 20 and the ball-mill 1 through the funnel-shaped portion 43, as hereinafter referred to. Not only is the current of air drawn from the said annular space but the funnel-shaped portion 43 also extends below the point where the plates 32, 33, 34 and 35 meet the top of the box 38 so that there is always a current of air to some extent drawn from the interior of the box into the funnel-shaped portion 43. The said current of air is produced by a high speed fan 46, making preferably 1800 revolutions per minute, which is pivotally supported within a pipe 47 having a flange 48 adapted to be connected in any suitable way to a flange 49 on the funnel-shaped portion 43. This fan 46 is driven by an electric motor 50 by means of a current supplied by leads 51 and 52 and the pipe 47 with the fan enclosed therein is adapted to be supported by means of a rod 53 having a hook 54 for engagement with a link 55 depending from a carrier 56 having four rollers 57 thereon which are adapted to run upon an I-beam 58 supported in any suitable way. It will be understood that two of the rollers 57 are located at either side of the I-beam 58. This arrangement is such as to enable the pipe 47 and the fan therein to be moved laterally away from the side of the ball-mill 1 so that all of the housing parts and dust-discharge parts used in connection with the ball-mill may be transferred to some other ball-mill for the removal of the dust therefrom while the ball-mill 1 is again being filled and operated for the grinding of the powder therein. At the other end of the pipe 47 there is a flange 59 adapted to be secured in any desired way to a flange 60 on a discharge pipe 61 having its outlet located in a window 62 located in the wall of the building in which the ball-mills are situated. This discharge pipe 61 is designed to be permanently retained at the window 62 so that when the pipe 47 and fan 46 are removed to some other ball-mill it will be attached to smaller parts located therein instead of the particular discharge pipe 61.

In this manner, it will be understood that after the contents of the ball-mill have been ground by the operation of the same until the contents are ground to an impalpable powder, the manhole cover 14 is removed, the housing and dust discharge apparatus are then fastened in place and the box 38 is placed beneath the ball-mill. The ball-mill is then rotated until the powder therein is completely discharged therefrom. The powder falls into the box 38 either directly from the manhole opening 13 through the screen 18 or reaches the box after having first, to some extent, been ejected from the ball-mill into the semi-circular housings 19 and 20. No dust can escape in this operation owing to the fact that there is a current of air entering the housing above the top of the box 38 and around the edges of the flanges 39, 40, 41 and 42 that is to say entering over the top of the box 38 and thence under the edges of said flanges, and also a current of air entering between the wings 44 and 45 and the flanges 41 and 42, which withdraws air from the neighborhood of the point of junction between the housing and the box 38 due to the current of air being withdrawn through the wings 44 and 45 into the funnel-shaped portion 43 by the rotation of the fan 46, the current of air carrying the dust being ultimately discharged by the discharge pipe 61 through the window 62 into the outer atmosphere. In this way the escape of any dust into the interior of the plant containing mills 1, of which there may be any desired number, is entirely prevented.

While I have described my invention above in detail I wish it to be understood that many changes may be made therein without departing from the spirit of the same.

I claim:

1. In combination, an apparatus from which powdery materials are to be discharged and means for preventing the escape of dust during said discharge, comprising a housing for said apparatus, means for receiving the powdered materials discharged and means for drawing off a current of air from the interior of the housing, including a suction pipe having a wing extending adjacent the housing and over the point of junction between the housing and the apparatus into which the powdered materials are to be discharged.

2. In combination, an apparatus from which powdery materials are to be discharged and means for preventing the escape of dust during said discharge, comprising a housing for said apparatus, means for receiving the powdered materials discharged and means for drawing off a current of air from the interior of the housing and said receiving means, including a suction pipe having a wing extending adjacent the housing and over the point of junction between the housing and the apparatus into which the powdered materials are to be discharged.

3. In combination, an apparatus from which powdery materials are to be discharged and means for preventing the escape of dust during said discharge, comprising a housing for said apparatus, means for receiving the powdered materials discharged and means for drawing off a current of air from the interior of the housing, including a suction pipe having a wing extending adjacent the housing and over the point of junction between the housing and the apparatus into which the powdered materials are to be discharged, a clearance being provided between the housing and the said apparatus to permit the movement of the apparatus during said discharge.

4. In combination, an apparatus from which powdery materials are to be discharged and means for preventing the escape of dust during said discharge, comprising a housing for said apparatus, means for receiving the powdered materials discharged and means for drawing off a current of air from the interior of the housing and said receiving means, including a suction pipe having a wing extending around the housing and over the point of junction between the housing and the apparatus into which the powdered materials are to be discharged, a clearance being provided between the housing and the said apparatus to permit the movement of the apparatus during said discharge.

5. In combination, a milling apparatus adapted to produce powdery materials within the same from which the powdery materials are to be discharged and means for preventing the escape of dust during said discharge, including a housing for said apparatus, means for receiving the powdered materials discharged by gravity from said milling apparatus through one opening and means for drawing off a current of air from the interior of the housing through another opening, including a fan mounted in a suction pipe, movable toward and away from the housing.

6. In combination, a milling apparatus adapted to produce powdery materials within the same from which the powdery materials are to be discharged and means for preventing the escape of dust during said discharge, including a housing for said apparatus, means for receiving the powdered materials discharged by gravity from said milling apparatus through one opening and means for drawing off a current of air from the interior of the housing and said receiving means through another opening, including a fan mounted in a suction pipe, movable toward and away from the housing.

7. In combination, a milling apparatus adapted to produce powdery materials within the same from which the powdery materials are to be discharged and means for preventing the escape of dust during said discharge, comprising a housing for said apparatus, means for receiving the powdered materials discharged by gravity from said milling apparatus through one opening and means for drawing off a current of air from the interior of the housing through another opening, including a suction fan mounted in a suction pipe, and a laterally movable suspension mechanism for said pipe and fan.

8. In combination, a milling apparatus adapted to produce powdery materials within the same from which the powdery materials are to be discharged and means for preventing the escape of dust during said discharge, comprising a housing for said apparatus, means for receiving the powdered materials discharged by gravity from said milling apparatus through one opening and means for drawing off a current of air from the interior of the housing and said receiving means through another opening, including a suction fan mounted in a suction pipe, and a laterally movable suspension mechanism for said pipe and fan.

PHILIP BICKFORD WATSON.